(12) United States Patent
Idler et al.

(10) Patent No.: US 6,695,096 B2
(45) Date of Patent: Feb. 24, 2004

(54) EVACUATION SLIDE HAVING TOE END TRANSVERSE SUPPORT TUBE

(75) Inventors: John M. Idler, Mesa, AZ (US); Rodney L. Purdy, Chandler, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/981,658

(22) Filed: Oct. 16, 2001

(65) Prior Publication Data

US 2003/0070871 A1 Apr. 17, 2003

(51) Int. Cl.[7] .................................................. A62B 1/20
(52) U.S. Cl. ......................................... 182/48; 244/905
(58) Field of Search ............................ 182/48, 49, 70; 193/25; 244/905, 137.2

(56) References Cited

U.S. PATENT DOCUMENTS

| | | | | |
|---|---|---|---|---|
| 4,846,422 A | * | 7/1989 | Fischer | ..................... 182/48 X |
| 5,360,186 A | * | 11/1994 | Danielson et al. | ...... 244/905 X |
| 5,875,868 A | * | 3/1999 | Smialowicz et al. | .......... 182/48 |
| 5,975,467 A | * | 11/1999 | O'Donnell et al. | ....... 182/48 X |
| 6,454,220 B1 | * | 9/2002 | Oney | ....................... 182/48 X |

* cited by examiner

*Primary Examiner*—Blair M. Johnson
*Assistant Examiner*—Hugh B. Thompson
(74) *Attorney, Agent, or Firm*—Jerry Holden

(57) ABSTRACT

An inflatable evacuation slide includes a feature for propelling disembarking passengers onto their feet at the toe end of the slide. In one embodiment, the slide comprises a fabric sliding surface stretched between two lateral side rail tubes. The lateral side rail tubes are supported by plurality of transverse tubes and transverse trusses such that the side rail tubes maintain the sliding surface in a taut condition suitable for use as a slide. The foot end of the tube includes a transverse tube having a reduced diameter and a lower surface that is suspended above the ground or other surface on which the foot end of the evacuation slide is resting. The suspended toe end transverse tube has a lower spring rate than a full-diameter transverse toe end tube. Therefore, the suspended toe end transverse tube provides the appropriate springiness for catapulting a sliding passenger onto his or her feet at the foot end of the slide notwithstanding the higher inflation pressure.

8 Claims, 3 Drawing Sheets

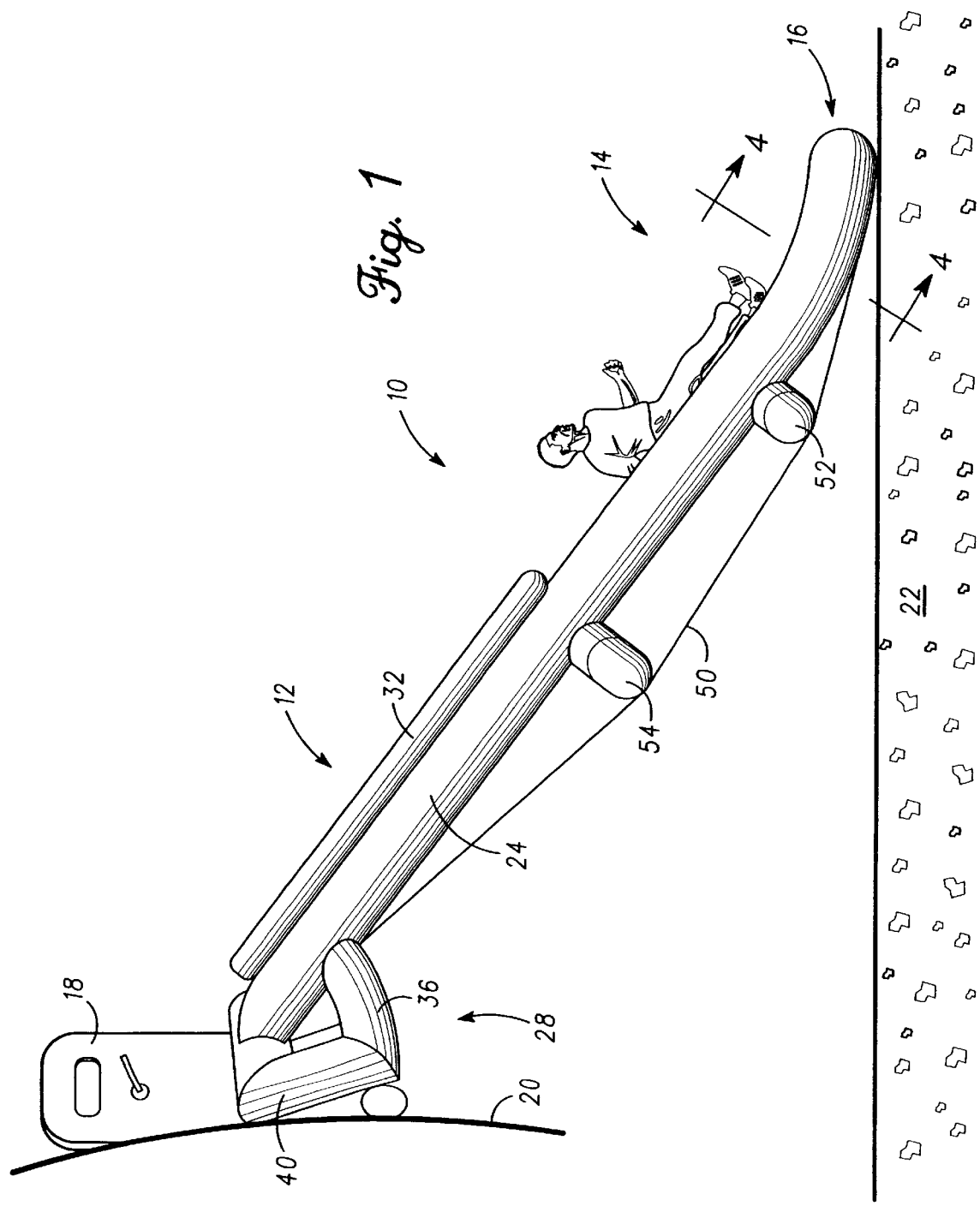

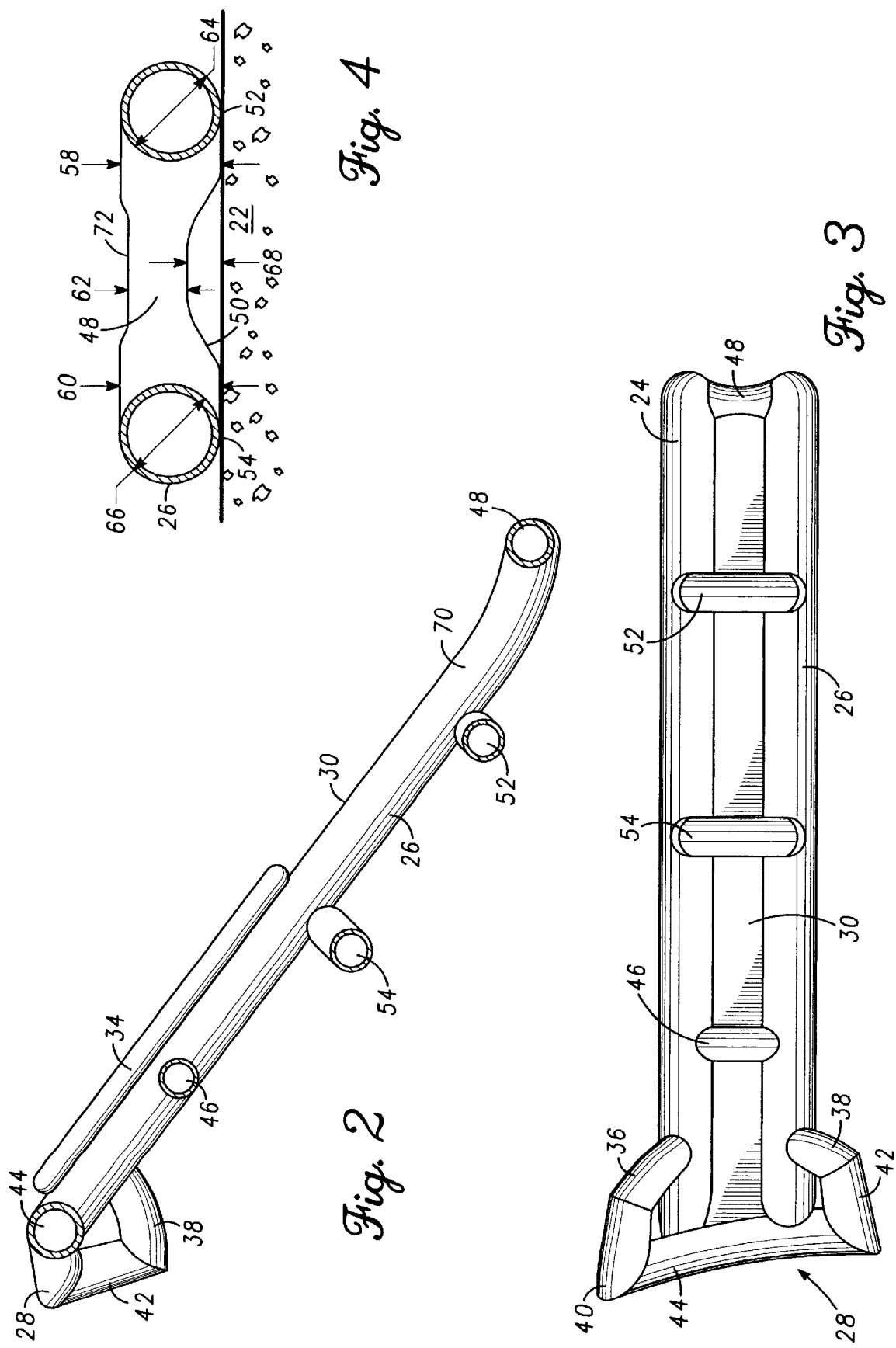

EVACUATION SLIDE HAVING TOE END TRANSVERSE SUPPORT TUBE

BACKGROUND OF THE INVENTION

This invention relates to emergency evacuation equipment for aircraft, in particular, to inflatable aircraft evacuation slides.

The requirement for reliably evacuating airline passengers in the event of an emergency is well known. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Although evacuation slides permit passengers to quickly and safely descend from the level of the aircraft exit door to the ground, some passengers may experience difficulty moving from the seated position on the slide to a standing position exiting the slide. In an emergency situation, a passenger that is slow to exit the foot end of the slide may be struck by the next passenger descending the slide. Traditionally, the need to move passengers quickly away from the foot end of the evacuation slide has been accommodated by positioning a flight attendant at the foot end of the slide to assist the disembarking passengers. However, in an emergency, there may not be sufficient flight attendants to staff the foot end of each evacuation slide. For this reason, it would be advantageous if the foot end of an inflatable evacuation slide were designed so as to assist (e.g. by bouncing) the passenger upward onto his or her feet at the bottom "foot" end of the slide.

Prior art inflatable evacuation slides typically comprise several parallel tubular members attached together to form the sliding surface of the evacuation slide. Such slide construction is disclosed, for example, in U.S. Pat. No. 3,669,217 to Fisher and U.S. Pat. No. 4,434,870, also to Fisher. Use of multiple parallel tubes creates a rigid sliding surface, but at the cost of substantial weight devoted to the multiple tubes and, in any event, many such slides still do not provide sufficient springiness at the foot end to assist passengers to their feet. The requirement that aircraft evacuation slides be made lighter and lighter in weight has lead to the current generation aircraft evacuation slides which comprise a pair of inflatable tubular side rail members with a fabric sliding surface stretched therebetween. A head end and a toe end transverse tube maintain the side rails in a spaced-apart configuration while a plurality of lower truss members in combination with one or more straps provide the needed rigidity for the lightweight design.

The demand for lighter and lighter weight aircraft evacuation slides is being addressed by designing evacuation slides to operate a higher and higher pressures. A high pressure inflatable tubular structural member can be made smaller in cross section, thereby using less weight in fabric, while maintaining the same rigidity as a larger lower pressure structure. Therefore, while current state of the art aircraft evacuation slides typically operate at pressures of two to two and one-half pounds per square inch gauge (PSIG), one can expect to see aircraft evacuation slides operating at pressure ranges of 4 PSIG or even more in the near future. Unfortunately, although a small diameter high pressure tubular structural member has an equal resistance to deflection under load as a larger lower pressure inflatable tubular structural member, the high pressure tubular member has a substantially greater effective spring rate when subjected to a compressive load. Accordingly, what is needed is a high pressure evacuation slide having sufficient flexibility and springiness at the foot end to adequately catapult a sliding passenger onto his or her feet.

SUMMARY OF THE INVENTION

The present invention comprises an inflatable evacuation slide having a feature for propelling disembarking passengers onto their feet at the toe end of the slide. In one embodiment, the slide comprises a fabric sliding surface stretched between two lateral side rail tubes. The lateral side rail tubes are supported by plurality of transverse tubes and transverse trusses such that the side rail tubes maintain the sliding surface in a taut condition suitable for use as a slide. The foot end of the tube includes a, transverse tube having a reduced diameter and a lower surface that is suspended above the ground or other surface on which the foot end of the evacuation slide is resting. The suspended toe end transverse tube has a lower spring rate than a full-diameter transverse toe end tube. Therefore, the suspended toe end transverse tube provides the appropriate springiness for catapulting a sliding passenger onto his or her feet at the foot end of the slide notwithstanding the higher inflation pressure.

BRIEF DESCRIPTION OF THE DRAWING

The present invention will be better understood from a reading of the following detailed description, taken in conjunction with the accompanying drawing figures in which like references designate like elements and, in which:

FIG. 1 is a side view of an evacuation slide incorporating features of the present invention;

FIG. 2 is a cutaway view of the evacuation slide of FIG. 1;

FIG. 3 is a bottom view of the evacuation slide of FIG. 1;

FIG. 4 is a cutaway view of the evacuation slide of FIG. 1 taken along line 4—4; and is an alternate embodiment of the toe end transverse tube shown in FIG. 4.

DETAILED DESCRIPTION

Figure 5:
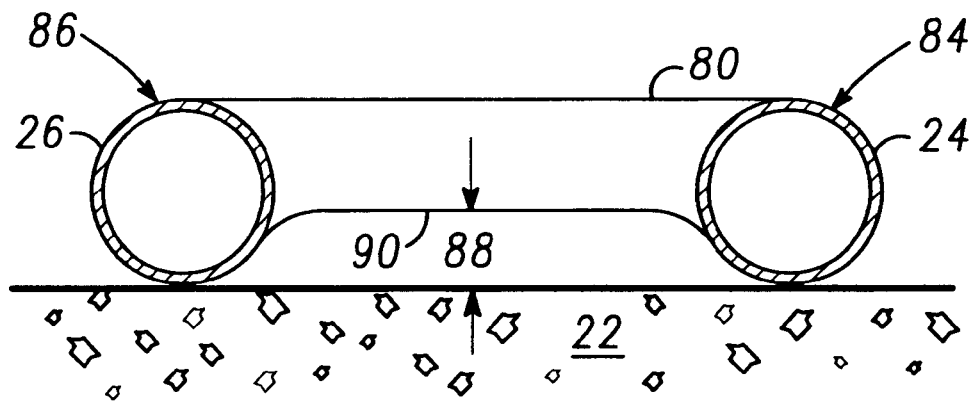
FIG. 5 is a plan view of a panel of fabric used to fabricate a toe end transverse tube incorporating features of the present invention.

The drawing figures are intended to illustrate the general manner of construction and are not necessarily to scale. In the detailed description and in the figures, specific illustrative examples are shown and herein described in detail. It should be understood, however, that the drawing the figures and detailed description are not intended to limit the invention to the particular form disclosed, but are merely illustrative and intended to teach one of ordinary skill how to make and or use the invention claimed herein and for setting forth the best mode for carrying out the invention.

FIG. 1 shows an inflatable evacuation slide assembly 10 incorporating features of the present invention. Evacuation slide assembly 10 generally comprises a head end 12, an and a foot end 14 terminating at the toe end 16. Head end 12 is configured to couple evacuation slide assembly 12 to an exit door 18 of an aircraft 20 while foot end 14 is in contact with the ground 22 such that the slide assembly 10 provides a sloping surface to permit the rapid egress of passengers from aircraft 20.

The entire inflatable evacuation slide assembly 10 is preferably fabricated from an air impervious material such as a lightweight fabric that has been coated with an elastomer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all of the chambers comprising the structure are interconnected pneumatically, such that a single pressurized gas source, such as compressed carbon dioxide, nitrogen, argon, a pyrotechnic gas generator or combination thereof may be utilized for its deployment. The main body of evacuation slide assembly 10 comprises side rail tubes 24, 26 which extend from head end truss assembly 28 to the ground. A slide surface 30 comprising a fabric membrane is stretched between side rail tubes 24 and 26 to provide a sliding surface for the disembarking passengers. A right hand rail 32 and a left hand rail 34 are positioned atop side rail tubes 24 and 26, respectively, to provide a hand hold for passengers descending evacuation slide assembly 10. Head end truss assembly 28 comprises a plurality of strut tubes 36, 38, upright tubes 40, 42 and a transverse tube 44 adapted to hold head end 12 of evacuation slide assembly 10 against the fuselage of aircraft 20 in an orientation to permit escape slide assembly 10 to unfurl in a controlled manner as it extends toward the ground.

The spaced apart configuration of side rail tubes 24 and 26 is maintained by a head end transverse tube 46 and a toe end transverse tube 48. The bending strength of escape slide assembly 10 is enhanced by means of one or more tension straps 50 stretched from toe end 16 over foot end transverse truss 52, medial transverse truss 54 and attached proximal head end 12 of evacuation slide assembly 10. As described, evacuation slide assembly 10 provides a lightweight structure that consumes a minimum amount of inflation gas while providing the necessary structural rigidity to permit passengers to safely evacuate an aircraft under emergency conditions.

Unfortunately, in the as-deployed condition, when inflated to 4 PSIG or more, a transverse toe end tube 48 that is the full diameter of toe end 16 of side rail tubes 24 and 26 has too high a spring rate and provides insufficient damping. Accordingly, instead of acting as a spring to assist the disembarking passengers in getting to their feet and moving quickly away from the foot end of the slide, a full diameter high pressure toe end tube provides excessive upward force. A sliding passenger would, therefore, be propelled forcefully into the air in an uncontrolled manner, resulting in possible injury or injury of other disembarking passengers exiting the slide. An injured evacuee on the ground in the pathway of other passengers could further compound the problem by obstructing the slide exit, causing evacuation delays and/or additional injuries.

As shown most clearly in FIGS. 3–5, inventors of the present invention determined that the effective spring rate of toe end transverse tube 48 could be reduced without the necessity of reducing the pressure within transverse toe end tube 48 by providing a toe end transverse tube 48 having a lower surface 50 that is displaced upward from lower surfaces 52 and 54 of side rail tubes 24 and 26, respectively, such that lower surface 50 is suspended above the ground 22 or other surface on which side rails 24 and 26 are resting. In one embodiment, transverse toe end tube 48 has a first diameter dimension 58 and a second diameter dimension 60 that are approximately equal to the diameter dimensions 64 and 66 of side rail tubes 24 and 26, respectively. Toe end transverse tube 48 then tapers to a diameter dimension 62 that is smaller than diameter dimensions 58 and 60. Additionally, the reduction in the diameter of toe end transverse tube 48 is not axisymmetric, but is offset such that there is an exaggerated gap 68 between bottom surface 50 of toe end transverse tube 48 and ground 22. For example, in one embodiment side rail tubes 24 and 26 each have a diameter dimension of 18.5 inches. Transverse toe end tube 48 also has diameter dimensions 58 and 60 equal to 18.5 inches. Toe end transverse tube 48 then tapers to a dimension 62 equal to 13 inches the taper is not equal top-to-bottom, which would result in a gap 68 of only 2.75 inches. Instead, the taper is offset such that gap 68 is equal to approximately 4 inches.

Figure 6:
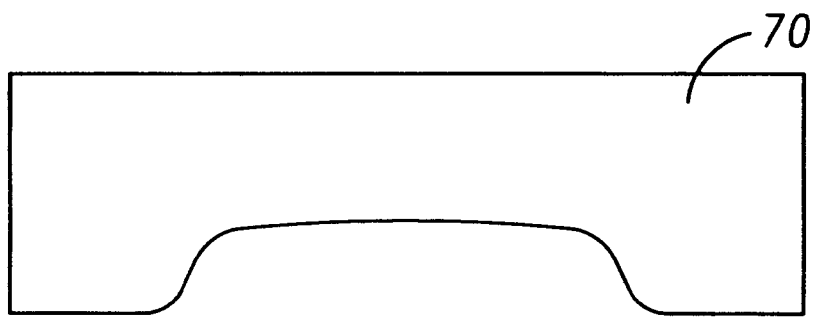
FIG. 6 is a view of a panel used to form a tubular structure of the offset taper in the toe end transverse tube.

The offset taper in transverse toe end tube 48 is effected by bonding two identical panels such as panel 70 (FIG. 6) to form a tubular structure. Although the entire offset is on one side of panel 70, when toe end transverse tube 48 is inflated, the resulting distribution of stresses causes some distortion in the upper surface 72 of panel 70. Nevertheless, the majority of the offset remains in the lower surface 50 as hereinbefore discussed.

In an alternative embodiment, toe end transverse tube 78 comprises a cylindrical tube of reduced diameter that is attached to side rails 24 and 26 in a position that is displaced upward such that upper surface 80 is relatively flush with upper surfaces 84 and 86 of side rail tubes 24 and 26, respectively. This attachment method results in a similar gap 88 between the lower surface 90 of toe end transverse tube 78 and the ground 22. Although the embodiment of FIG. 5 results in a toe end transverse tube 78 that is simpler to construct, it does so at the expense of a more complex stress distribution at the junctions between transverse toe end tube 78 and side rails 24 and 26.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law.

What is claimed is:

1. An inflatable escape slide assembly adapted to extend from an elevated supporting surface to a lower supporting surface, said inflatable escape slide assembly comprising:

a flexible panel defining a slide surface having first and second lateral edges and extending from a head end of the inflatable escape slide assembly to a foot end of the inflatable escape slide assembly;

first and second side rail members attached to said first and second lateral edges of said flexible panel, said first and second side rail members each comprising an inflatable tubular member extending from the head end to the foot end of the inflatable escape slide assembly, said first and second side rail members being disposed in a spaced-apart configuration for supporting said flexible panel;

a head end transverse tube for maintaining the head end of said first and second side rail members in said spaced-apart configuration; and a toe end transverse tube for maintaining the foot end of said first and second side rail members in said spaced-apart configuration, said toe end transverse tube comprising an inflatable tubular member attached to said first and second side rail members proximal the foot end of said inflatable escape slide assembly and in fluid communication with at least one of said first and second side rail members; said toe end transverse tube having a first cross-sectional cylindrical diameter dimension at a first end proximal said first side rail member, a second cross-sectional cylindrical diameter dimension at a second end proximal said second side rail member and a third cross-sectional cylindrical diameter dimension medial said first and second ends, said third cylindrical diameter dimension being smaller than said first and second diameter dimensions.

2. The inflatable escape slide assembly of claim 1, wherein:

said toe end transverse tube tapers inward from said first cylindrical diameter dimension to said third cylindrical diameter dimension then outward from said third cylindrical diameter dimension to said second cylindrical diameter dimension moving from said first end to said second end.

3. The inflatable escape slide assembly of claim 1, wherein:

said first, second and third cylindrical diameter dimensions each define a center thereof and the center of said third cylindrical diameter is adapted to be offset upwards from the centers of said first and second cylindrical diameters relative to the lower supporting surface.

4. An inflatable escape slide assembly adapted to extend from an elevated supporting surface to a lower supporting surface, said inflatable escape slide assembly comprising:

a flexible panel defining a slide surface having first and second lateral edges and extending from a head end of the inflatable escape slide assembly to a foot end of the inflatable escape slide assembly;

first and second side rail members attached to said first and second lateral edges of said flexible panel, said first and second side rail members each comprising an inflatable tubular member extending from the head end to the foot end of the inflatable escape slide assembly, said first and second side rail members being disposed in a spaced-apart configuration for supporting said flexible panel, said first and second side rail members each having a lower surface, said lower surface of said first side rail member and said lower surface of said second side rail member defining a lowermost curvilinear surface therebetween;

a head end transverse tube for maintaining the head end of said first and second side rail members in said spaced-apart configuration; and a toe end transverse tube for maintaining the foot end of said first and second side rail members in said spaced-apart configuration, said toe end transverse tube comprising an inflatable tubular member proximal the foot end of said inflatable escape slide assembly said toe end transverse tube having a first end attached to said first side rail member and a second end attached to said second side rail member, said toe end transverse tube being in fluid communication with at least one of said first and second side rail members at the foot end; said toe end transverse tube having a bottom surface tapering to said first and second ends, said bottom surface medial of said first and second ends adapted to be offset upward from said lowermost curvilinear surface relative to the lower supporting surface.

5. The inflatable escape slide assembly of claim 4, wherein:

said toe end transverse tube comprises a substantially cylindrical tube having a diameter dimension that is less than the diameter dimensions of said first and second side rail members.

6. The inflatable escape slide assembly of claim 5, wherein:

said toe end transverse tube defines a cylindrical axis, said toe end transverse tube being attached to said first and second side rail members in a position displaced upward relative to said first and second side rail members such that said cylindrical axis defines an axis that passes above the centerline axes of said first and second side rail members.

7. The inflatable escape slide assembly of claim 4, wherein:

said toe end transverse tube comprises a first cylindrical diameter dimension at a first end proximal said first side rail member, a second cylindrical diameter dimension at a second end proximal said second side rail member and a third cylindrical diameter dimension medial said first and second ends, said third cylindrical diameter dimension being smaller than said first and second diameter dimensions.

8. The inflatable escape slide assembly of claim 7, wherein:

said toe end transverse tube tapers inward from said first cylindrical diameter dimension to said third cylindrical diameter dimension then outward from said third cylindrical diameter dimension to said second cylindrical diameter dimension moving from said first end to said second end.

* * * * *